United States Patent Office 3,441,613
Patented Apr. 29, 1969

3,441,613
METHOD FOR THE PREPARATION OF ACROLEIN
Joseph W. Nemec, Rydal, Pa., and Francis W. Schlaefer, Pennsauken, N.J., assignors to Rohm & Haas Company, Philadelphia, Pa., a corporation of Delaware
No Drawing. Continuation-in-part of application Ser. No. 495,318, Oct. 12, 1965. This application Aug. 22, 1966, Ser. No. 573,863
The portion of the term of the patent subsequent to Dec. 17, 1985, has been disclaimed
Int. Cl. B01j $11/34$; C07c $45/10, 47/22$
U.S. Cl. 260—604        5 Claims

ABSTRACT OF THE DISCLOSURE

This invention is directed to a method for preparing acrolein by oxidation of propylene. More particularly the invention relates to a method of preparing acrolein by reacting proplyene with oxygen and water in a temperature range of about 300° C. to 500° C. and in the presence of a specific novel catalyst system. The process of the present invention gives consistently good yields of desired product over prolonged periods of catalyst use. The novel catalyst system comprises a copper molybdate-copper telluride catalyst.

---

This application is a continuation-in-part of application Ser. No. 495,318, filed Oct. 12, 1965 and now abandoned.

This invention deals with a method for the preparation of acrolein. It more particularly deals with a method for the preparation of acrolein from propylene employing a specific novel catalyst system.

The present invention comprises reacting propylene with oxygen and water in the presence of a copper molybdate-copper telluride catalyst at a defined temperature and within limited ratios of reactants. Furthermore, the present invention is concerned with a process which consistently gives good yields of desired product over prolonged periods of catalyst use. The present invention provides a process in which the catalyst employed affects high selectivity in the oxidation of propylene which results in good yields of acrolein.

The general procedure of oxidizing propylene to form acrolein is well documented in the prior art with favorable results being obtained when a catalyst system containing certain oxides, such as cobalt molybdate and copper oxide, is promoted with certain Group VI–A oxides with tellurium dioxide being particularly preferred. An undesirable feature of the tellurium dioxide promoted system is the lack of retention of the promoter. While the freshly promoted catalyst provides good yields of acrolein, the tellurium dioxide under the reaction conditions (350° to 500° C.) is rather rapidly eluted from the reactor and the yields decrease appreciably with increasing catalyst age. This phenomenon is not wholly unexpected, since tellurium dioxide readily sublimes at high temperatures. This, of course, requires repromotion and recovery of the extremely toxic tellurium from the reactor effluent.

Accordingly, the present invention is concerned with a catalyst system which consistently gives high yields of product over prolonged periods of catalyst use. Furthermore, the present invention is advantageous in sharply reducing the highly exothermic competing reaction of the oxidation of propylene to waste gas. This is a benefit because otherwise the exothermic heat produced has to be controlled and abated. The present invention accomplishes all of this while increasing the yield of the desired product.

The present catalyst system contemplates incorporation of copper molybdate with copper telluride. The basis for the invention is the use of this novel catalyst system to provide high selectivity in the oxidation of propylene and thereby give good yields of acrolein over a prolonged period of operation.

The above-mentioned property of permanence is particularly important in commercial operations. Thus, with the present invention, once desired reaction conditions are achieved, as described hereinafter, production can be maintained for extended periods of time without the prior art necessity of modifying operating temperatures or feedstream compositions to adjust for the change in the catalyst system. Furthermore, the complex nature of the equipment needed to isolate the desired product makes it highly desirable that the composition of the effluent remain constant. This objective is readily realized in the process of the present invention.

Also, the high cost of tellurium commercially demands that any tellurium eluted from the bed must be recovered. By using the catalyst system of this invention, one skilled in the art is freed from the economic burden. Accordingly, use of the present invention eliminates the capital investment needed for this recovery equipment.

The attractiveness of the present invention is further enhanced when one considers the high toxicity of tellurium and its compounds. This problem is substantially completely eliminated by the present invention. Thus, since the present catalyst system is not subject to elution, there are no toxic vapors to sublime out of the reactor.

Another distinct advantage of the present invention is its ability to produce acrolein in high yield while still maintaining a reactor feedstream ratio of essentially one of propylene to one of oxygen. Such a ratio is particularly desirable in commercial operations. Thus, ratios higher than one to one result in effluent streams containing large quantities of unreacted propylene. This, of course, aggravates the task of separating the unreacted propylene. Ratios substantially lower than one to one do not make efficient use of the costly reactor and its attendant equipment.

The present process is conducted in a temperature range of about 300° to about 500° C., preferably about 400° to about 450° C. The reaction may be conducted at atmospheric pressure or at pressures somewhat above atmospheric, such as about 1 to about 40 atmospheres. Generally, atmospheric pressure is preferred.

Oxygen may be used as such in the reaction or may be supplied as air. It is desirable in the present reaction to employ a diluent to facilitate control of this highly exothermic reaction. Therefore, if oxygen is employed as such, it is preferred to employ a gaseous diluent, such as carbon dioxide, nitrogen or the like. The carbon dioxide diluent is most economically provided from the carbon dioxide produced in the process. If oxygen is employed as the normal 20% component of air, then nitrogen is already present as a useful diluent. Under certain circumstances, such as if recycling is intended, it is preferred to use oxygen itself. Otherwise, the use of oxygen as a component of air is quite satisfactory for the present purposes.

The propylene is employed in a ratio with respect to oxygen of 1:0.2 to 1:2, preferably 1:0.8 to 1:1.2. It is particularly desirable to have a substantially 1:1 ratio. It is entirely unnecessary to provide any appreciable excess of propylene over that previously set forth.

The ratio of water to propylene is about 1:1 to 15:1, preferably about 2:1 to 6:1. The contact time can range from 12 seconds to as low as 0.2 second, but about 0.6 second to about 4.0 seconds is preferred. Longer contact times generally produce higher propylene conversions, but this is accompanied by an increase in waste gas formation. One skilled in the art may balance these two factors to obtain the contact time which results in the most economical operations. Generally, operation from about 20 to about 60% conversion is satisfactory with about 30 to about 50% preferable. It is possible to operate at a lower conversions where somewhat better selectivity is observed. The principal product of the present process is acrolein. Small amounts of acrylic acid, acetic acid, carbon monoxide and carbon dioxide are also formed but their formation is held at a very low level by virtue of the high oxidative selectivity of the present invention.

The copper molybdate-copper telluride catalyst is employed as pellets or other moderately sized particles, such as 10–20 mesh or larger particles, optionally on a carrier, such as silica, zirconia, pumice and the like.

The copper molybdate is considered to be an intimate physical mixture of the oxides of molybdenum and copper. The copper telluride, which has the formula $$Cu_2Te$$

is employed in the range of about 0.10 to about 5.0%, preferably about 0.10 to about 1.0%, based on the weight of the copper molybdate. The copper telluride is employed in comminuted form of such a particle size that it passes through an 80 mesh screen. The copper telluride is normally mixed with the copper molybdate by any standard mixing procedure, such as tumbling and the like, and is readily absorbed by the copper molybdate. Moderate care should be employed during the mixing operation to avoid fracture of the copper molybdate.

The present invention may be more fully understood from the following illustrative examples.

PREPARATION OF THE CATALYST SYSTEM

A 500 g. quantity of ammonium heptamolybdate was dissolved, with stirring, in 500 ml. of deionized water and heated to 65° C. Another solution, prepared by dissolving 675 g. of cupric nitrate trihydrate in 750 ml. of deionized water at 65° C. was then slowly added, with stirring, to the ammonium heptamolybdate solution. The copper molybdate was precipitated by agitating the resultant mixture at 300 r.p.m. and then adding, dropwise, 380 ml. of a 15% aqueous ammonia solution. The ammonia addition period encompassed 27 minutes, during which time the solution temperature ranged between 36° and 40° C. During this interval, the pH gradually rose from 2 to 4½ while the yellow-green copper molybdate precipitate became increasingly thicker. Addition of ammonia in excess of 380 ml. results in a catalyst having a substantially lower copper/molybdenum ratio. Ammonia charges substantially less than 380 ml. result in incomplete precipitation.

The precipitated copper molybdate was filtered, with suction, and then washed on the filter with 5 one liter portions of deionized water. The filtrate produced by the first wash had an intense blue color, indicating a substantial cupric ion concentration. The color intensity gradually decreased as the washing proceeded, with the final wash having only a faint blue tinge. The filter cake was removed from the filter and slurried for one hour with one liter or deionized water. The slurry was then filtered, with suction. At this stage, the filter cake contained a large amount of entrained water and it was necessary to continually spread the precipitate over the cracks which developed in the filter cake. This produced a substantial vacuum in the filter flask and assured removal of a maximum quantity of water. The filtrate from this operation was colorless, thus signifying the absence of cupric ions in the filter cake. The filter cake was then charged to a tubular calciner and heated, in the presence of a 6 liter/minute air flow, to 100° to 170° C. over a 1½ hour period. This was marked by a continuous and heavy evolution of steam from the calciner. The temperature was then raised over 3½ hour period to 500° to 645° C. This served to crack the ammonia out of the copper molybdate polymer. The oxides were then calcined by heating at 550° to 645° C. for another 32 hours. After cooling to room temperature, the yellow-green catalyst of the present invention was removed from the calciner and crushed to obtain 10–20 mesh particles. The calcined copper molybdate contained about 24% copper and about 49% molybdenum. A 160 ml. quantity of this material was then intimately mixed with 0.44 g. of finely divided copper telluride to form the catalyst system of the present invention.

EXAMPLE 1

A stainless steel tubular reactor, equipped with a preheater, was charged with 160 ml. of the aforedescribed copper molybdate-copper telluride system and heated in a molten salt bath at 455° C. A feedstream having a propylene/air/stream ratio of 1/4.6/4 was passed through the catalyst bed for 8.34 hours, the contact time being 1.5 seconds. The yield of acrolein was 74% and the propylene conversion 30%. Acetaldehyde, acetone, acrylic acid, acetic acid and waste gas were formed in 1.5, 1.5, 7.3, 1.1 and 15% yields, respectively.

EXAMPLE 2

Immediately after the above experiment was complete, a similar feedstream was passed through the same catalyst bed at 448° C. for 2.0 hours, the contact time being 1.5 seconds. The yield of acrolein was 72% and the propylene conversion 26%. The other products, acetaldehyde, acetone, acrylic acid, acetic acid and waste gas were formed in 1.7, 1.7, 9.5, 0.9 and 14% yields, respectively.

EXAMPLE 3

Upon completion of the above experiment, the temperature was lowered to 438° C. A feedstream identical to that in Example 2 was then passed over the aforementioned catalyst bed, the contact time being 1.5 seconds. The duration of the experiment was 2.2 hours, while the propylene conversion was 20%. The yield of acrolein was 77% while the yields of acetaldehyde, acetone, acrylic acid, acetic acid and waste gas were 1.8, 1.8, 5.7, 1.5 and 12%, respectively.

EXAMPLE 4

The catalyst bed used for experiments 1 through 3, above, was heated to 437° C., over which was passed a feedstream having a propylene/air/steam ratio of 1/4.6/4. The duration of the experiment was 13.6 hours and the contact time again was 1.5 seconds. The propylene conversion was 16%, while the yield of acrolein was 75%. Acetaldehyde, acetone, acrylic acid, acetic acid and waste gas were also formed in 1.7, 1.7, 6.4, 1.8 and 13% yields, respectively.

EXAMPLE 5

This experiment employed the same bed of catalyst, described above, and was conducted subsequent to the completion of experiment 4. The feedstream ratio and reactor temperature were also similar, but the contact time was increased to 2 seconds. The duration of the experiment was 1.25 hours. The yield of acrolein was 78%, but the propylene conversion increased to 28%. The yields of acetaldehyde, acetone, acrylic acid, acetic acid and waste gas were 1.8, 1.8, 6.2 and 11%, respectively.

EXAMPLE 6

A catalyst bed similar to that described above, but which had been used in acrolein production for over 15 hours, was heated to 436° C. A feedstream having a propylene/air/steam ratio of 1/4.6/4 was then passed over the bed for 3.4 hours. The contact time was 1.5 seconds. The propylene conversion was 21% while the yield of acrolein was 81%. Additionally, acetaldehyde, acetone, acrylic acid, acetic acid and waste gas were formed in 1.9, 1.9, 4.4, 1.6 and 9.7% yields, respectively.

We claim:

1. A method for the production of acrolein comprising reacting propylene, oxygen and water in the range of about 300° to about 500° C. in the presence of a catalyst system consisting essentially of a calcined copper molybdate and copper telluride, wherein said copper telluride is employed in an amount by weight of about 0.10 to about 5.0%, based on said copper molybdate, and in which the range of propylene to oxygen is about 1:0.2 to 1:2 and water to propylene is about 1:1 to 15:1.

2. A method for the production of acrolein comprising reacting propylene, oxygen and water in the range of about 300° to about 500° C. in the presence of a catalyst system consisting essentially of a calcined copper molybdate and copper telluride, wherein said copper telluride is employed in an amount by weight of about 0.10 to about 1.0%, based on said copper molybdate, and in which the range of propylene to oxygen is about 1:0.8 to 1:2 and water to propylene is about 2:1 to 6:1, in which contact times of about 0.2 to about 12 seconds are employed.

3. A method for the production of acrolein comprising reacting propylene, oxygen and water in the range of about 400° to about 450° C. in the presence of a catalyst system consisting essentially of a calcined copper molybdate and copper telluride, wherein said copper telluride is employed in an amount by weight of about 0.10 to about 1.0%, based on said copper molybdate, and in which the range of propylene to oxygen is about 1:0.8 to 1:2 and water to propylene is about 2:1 to 6:1, in which contact times of about 0.6 to about 4.0 seconds are employed.

4. A method according to claim 2 wherein said oxygen is supplied as a component of air wherein the reaction is conducted at substantially atmospheric pressures.

5. A method according to claim 1 wherein the reaction is conducted in the temperature range of about 400 to 450° C.

References Cited

UNITED STATES PATENTS

| 3,240,806 | 3/1965 | Bethell et al. | 260—604 |
| 2,670,380 | 2/1954 | Hadley | 260—604 |
| 2,627,527 | 2/1953 | Connolly et al. | 260—604 |
| 2,383,711 | 8/1945 | Clark et al. | 260—604 |

FOREIGN PATENTS

| 839,808 | 6/1960 | Great Britain. |

OTHER REFERENCES

Thorne et al.: "Inorganic Chemistry," 1949, p. 561 (2nd edition), Interscience Publishers.

LEON ZITVER, *Primary Examiner.*

R. H. LILES, *Assistant Examiner.*

U.S. Cl. X.R.

252—421, 467